United States Patent [19]

Norton et al.

[11] 3,862,202

[45] Jan. 21, 1975

[54] TEREPHTHALONITRILE PROCESS

[75] Inventors: Richard V. Norton, Wilmington, Del.; Ronald D. Bushick, Glen Mills, Pa.

[73] Assignee: Sun Research and Development Co., Marcus Hook, Pa.

[22] Filed: July 16, 1973

[21] Appl. No.: 379,908

[52] U.S. Cl. ................. 260/465 C, 260/465 H
[51] Int. Cl. ............................ C07c 121/02
[58] Field of Search ............. 260/465 C, 465 H

[56] References Cited
UNITED STATES PATENTS

| | | | |
|---|---|---|---|
| 3,206,378 | 9/1965 | Teramoto et al. | 260/465 H X |
| 3,472,891 | 10/1969 | Ikeda et al. | 260/465 H |
| 3,732,275 | 5/1973 | Platz et al. | 260/465 C X |
| 3,732,280 | 5/1973 | Norton | 260/465 C |
| 3,770,800 | 11/1973 | Norton | 260/465 C |

FOREIGN PATENTS OR APPLICATIONS

| | | | |
|---|---|---|---|
| 41-14375 | 11/1966 | Japan | 260/465 C |

OTHER PUBLICATIONS

Central Patent Index, Nov. 23, 1972, Abstract of U.S.S.R., 326182.

*Primary Examiner*—Joseph P. Brust
*Attorney, Agent, or Firm*—G. L. Church; D. R. Johnson; Paul Lipsitz

[57] ABSTRACT

In the process of separating terephthalonitrile from a gaseous ammoxidation product stream, the improvement which comprises cooling said hot product stream to a temperature above 150°C and below 165°C and separating solid crystals of high purity terephthalonitrile in high yield.

4 Claims, No Drawings

TEREPHTHALONITRILE PROCESS

It is known in the art of ammoxidation where p-xylene is converted to terephthalonitrile by catalytic reaction with ammonia and oxygen, that the product gas may be cooled to condense the terephthalonitrile. The terephthalonitrile so obtained contains significant amounts of by-product p-toluonitrile which must be removed. Terephthalonitrile begins to crystallize out from a gaseous ammoxidation stream at 170°C and, as pointed out in U.S. Pat. No. 3,472,891, condensation by cooling results in the product being in a colloidal state with the resultant formation of fume (i.e., a colloidal smoke) which is difficult to handle. To avoid such difficulties, the patent discloses that the ammoxidation process stream first be precooled to 180°C and then quenched with water to produce an aqueous slurry of the terephthalonitrile crystals. Although this water quenching technique yields a slurry of terephthalonitrile crystals which are easy to filter, the crystals so obtained are exceedingly impure and contain all of the by-product p-toluonitrile and unreacted p-xylene from the ammoxidation reactor. Another technique used heretofore to obtain terephthalonitrile in high purity is to condense the product stream to 105° to 150°C and to sublime the condensate in order to effect the necessary purification (Author's Certificate, U.S.S.R. 326182). Such sublimation techniques are cumberous and costly, requiring an input of expensive energy.

It has now been found, however, that a high purity terephthalonitrile product may be isolated from the gaseous ammoxidation product stream in good yield simply by cooling the stream to a temperature within a narrow temperature range, namely, above 150°C and below 165°C, and separating the condensed solid terephthalonitrile which forms. It is surprising that in view of the tendency for condensed terephthalonitrile to fume, that a crystalline, easily handled product of high purity is obtained by the process of the invention.

It will be understood that various means may be used to cool the ammoxidation product stream and separate the crystalline product. For example, cooling within a container having scraper blades may be used. More efficiently, the hot ammoxidation product stream may be fed into a helical screw cooled to condense the vapors at a temperature above 150° and below 165°C and feed the solid product to a receiver by screw rotation. Other devices and techniques will be obvious to those skilled in the art. The process of the invention is dependent upon cooling the gaseous ammoxidation stream and obtaining the solid terephthalonitrile product which separates from the cooled vapors. No cooling or quenching liquid is employed which comes in contact with the gaseous stream or the terephthalonitrile product. Thus, separation of the product without any liquid contamination is easily achieved.

The process of this invention is applicable to any vapor phase ammoxidation of p-xylene and this will include those ammoxidation procedures with and without oxygen and with any of the numerous catalysts useful in such processes. Also, the vapor phase ammoxidation may be carried out in a fixed bed, moving bed, fluidized bed or other type of reaction means for obtaining contact of the reactant vapors with the catalyst. Examples of typical ammoxidation procedures are set forth in U.S. Pat. Nos. 3,478,082 (Huibers, issued Nov. 11, 1969); 3,079,422 (Pasky, issued Feb. 26, 1963); and 3,501,517 (Hughes et al., issued Mar. 17, 1970). Usually, the major by-product impurity in such ammoxidation streams will be p-toluonitrile due to the incomplete reaction of the p-xylene starting material and the amount of such p-toluonitrile will vary over a wide range depending upon the particular process conditions of the reaction. Generally, however, the amount of such impurity will be from about 10 to 50 mole percent based on the total nitrile products; i.e., p-toluonitrile and terephthalonitrile. It will also be understood that unreacted hydrocarbon, ammonia and air (if used) will also be in the product stream, but these materials remain in the vapor phase and cause no difficulty during the separating out of the product terephthalonitrile.

In order to further illustrate the invention, the following examples are given:

EXAMPLES

An ammoxidation product stream was obtained from an ammoxidation reactor where p-xylene, $NH_3$ and air were reacted at 400° to 410°C using a $V_2O_5$ catalyst supported on silica. The stream was comprised essentially of gaseous terephthalonitrile, $CO_2$, p-xylene, air, $NH_3$, and p-toluonitrile and was fed at the effluent temperature of about 400°C through a 4 inch section of a thermostated 1 inch diameter glass pipe where condensation occurred, the temperature of condensation being determined by a thermocouple within the pipe. After condensation of each batch run, the terephthalonitrile product was removed from the pipe and weighed. The temperature of cooling was controlled by adjusting the heat input to the glass pipe.

| Ex. No. | Temperature of Cooled Ammoxidation Product Stream (°C) | p-TN in Product Stream (mole %)* | Crystalline Product Analysis p-TN TPN (mole %) | TPN Crystal Yield (mole %) |
|---|---|---|---|---|
| 1 | 120 | 30 | 29.0 | >95 |
| 2 | 130 | 33 | 29.0 | >95 |
| 3 | 140 | 31 | 21.0 | >95 |
| 4 | 150 | 29 | 9.0 | >95 |
| 5 | 151 | 35 | 6.1 | >95 |
| 6 | 155 | 33 | 3.5 | 90-95 |
| 7 | 159 | 25 | 3.1 | >95 |
| 8 | 160 | 13 | 1.3 | >95 |
| 9 | 160 | 29 | 2.9 | 90-95 |
| 10 | 161 | 35 | 6.1 | >95 |
| 11 | 162 | 17 | 2.1 | >95 |
| 12 | 165 | 47 | 8.4 | >95 |
| 13 | 170 | 31 | 1.7 | 85-90 | p-TN = p-Toluonitrile
TPN = Terephthalonitrile
*mole % = (pTN/pTN + TPN) × 100

It will be observed from a study of the above table that at temperatures below 150°C (Examples 1, 2 and 3) the isolated TPN is of low purity containing a large amount of p-toluonitrile. On the other hand, when the temperature of the cooled product stream is above 165°C (e.g., 170°C, Example 13), the yield of crystalline TPN falls off. At temperatures above 150° and below 165°C, however, the TPN isolated is very low in p-TN content and is obtained in very high yield.

The invention claimed is:

1. In the process of separating terephthalonitrile from a gaseous ammoxidation product stream, said terephthalonitrile being obtained by ammoxidation of p-xylene and containing p-toluonitrile as an impurity in an amount of from about 10 to 50 mole percent based on the total nitrile products, the improvement which comprises cooling said hot product stream without use of a quenching liquid to a temperature above 150°C and below 165°C and separating solid crystals of terephthalonitrile.

2. The process of claim 1 where the ammoxidation product stream contains from about 13 to about 35 mole percent of p-toluonitrile.

3. The process of claim 1 where the hot ammoxidation stream is fed into a helical screw cooled to condense the vapor.

4. The process of claim 1 where the hot ammoxidation stream is cooled within a chamber having scraper blades to remove the condensed product from the walls of said chamber.

* * * * *